Oct. 14, 1969     J. W. OREM ET AL     3,472,451
TANK WASHING APPARATUS
Filed Jan. 19, 1968     6 Sheets-Sheet 4
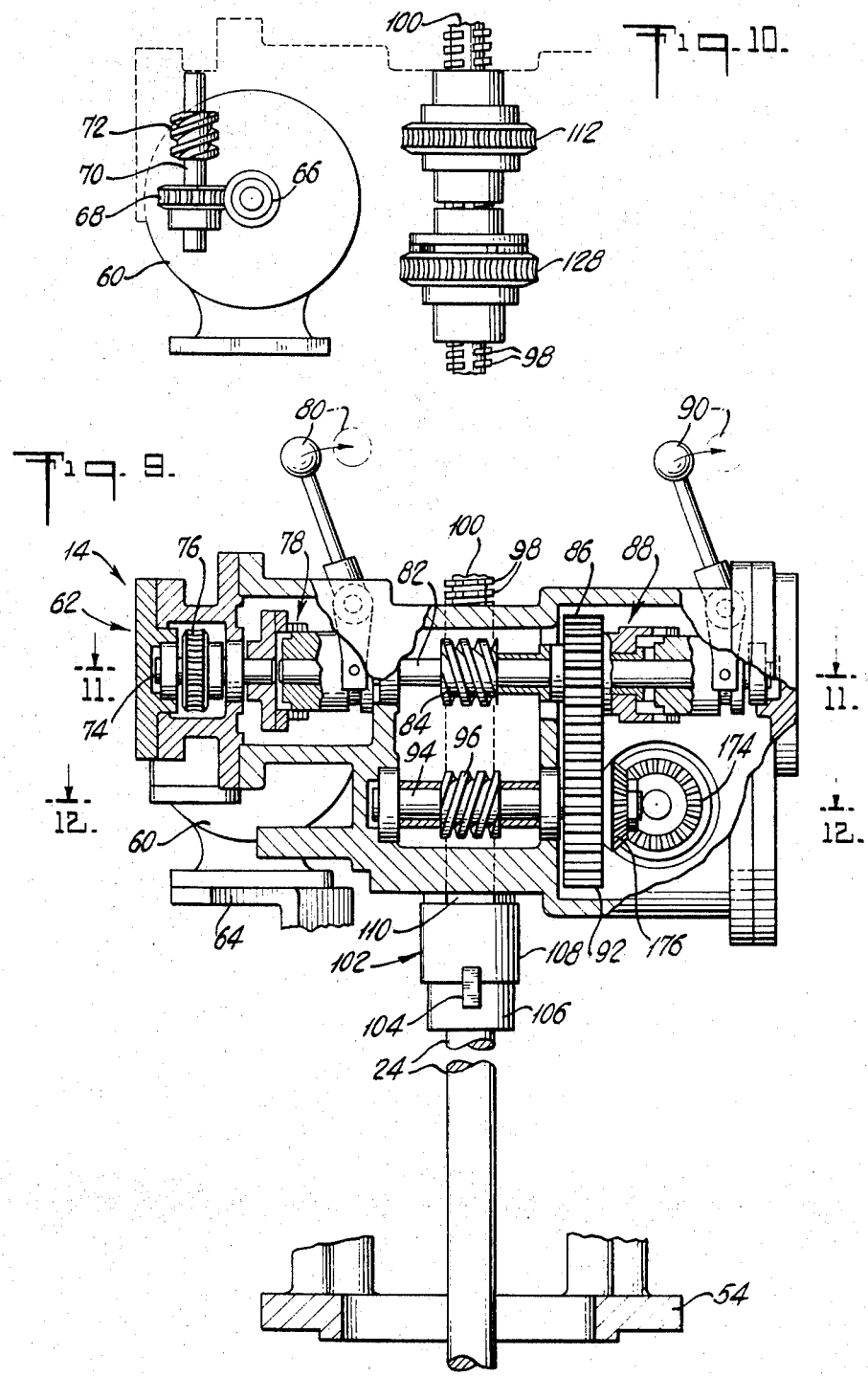
INVENTORS
JAMES W. OREM
LEONARD V. LIONE
DANIEL T. TURCO
ATTORNEY Oct. 14, 1969  J. W. OREM ET AL  3,472,451
TANK WASHING APPARATUS
Filed Jan. 19, 1968  6 Sheets-Sheet 5
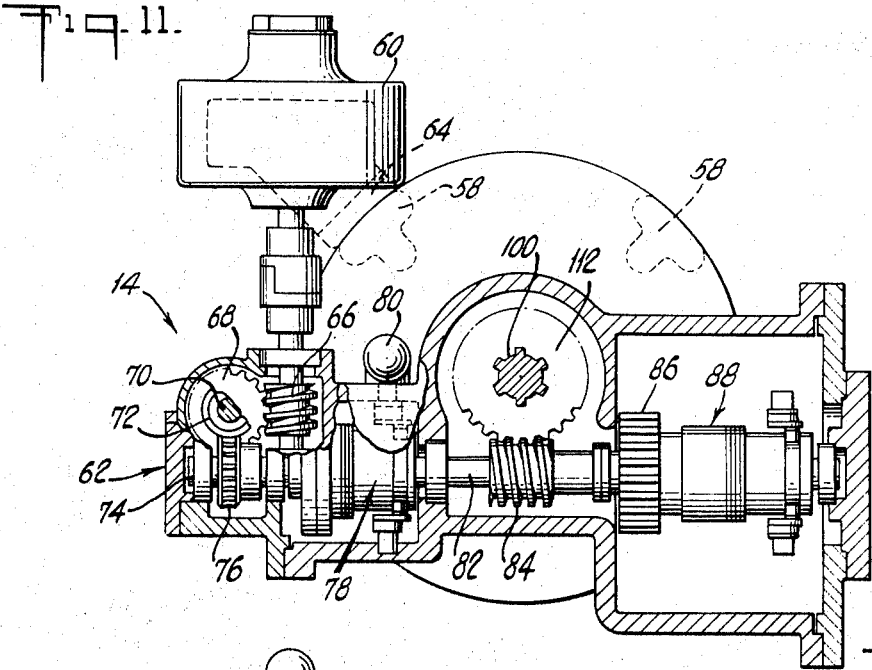
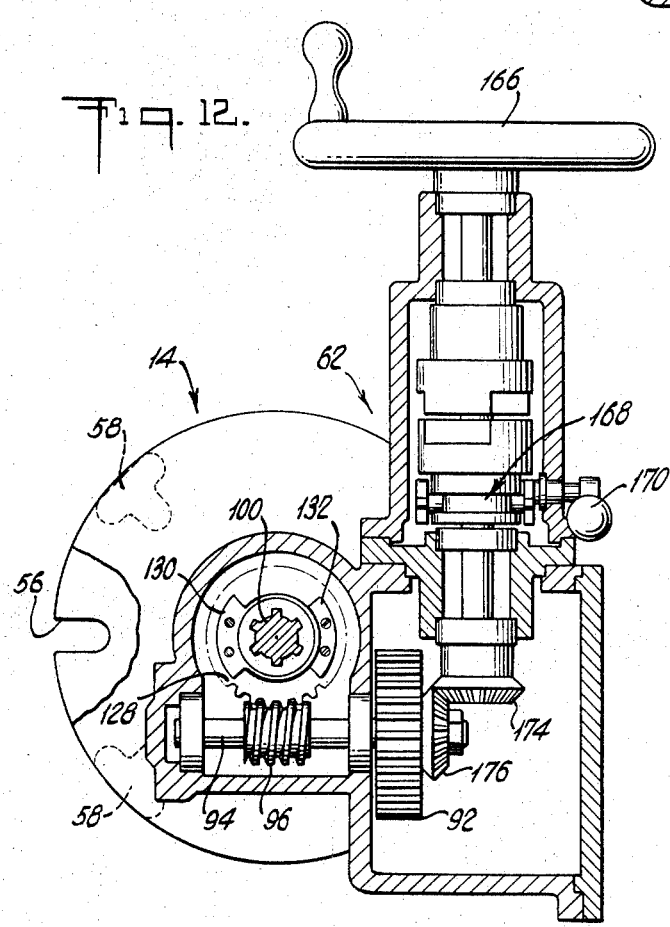
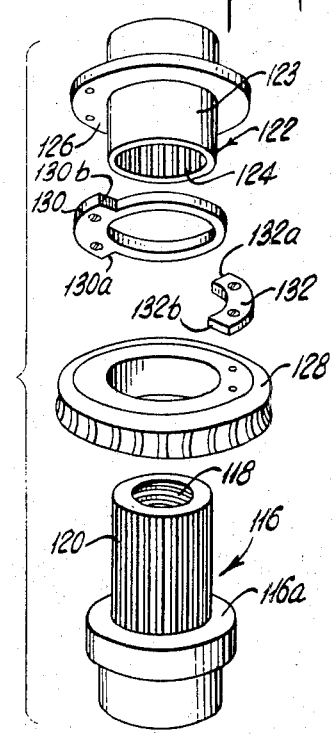
INVENTORS
JAMES W. OREM
LEONARD V. LIONE
DANIEL T. TURCO
W. O. T. Hilman
ATTORNEY

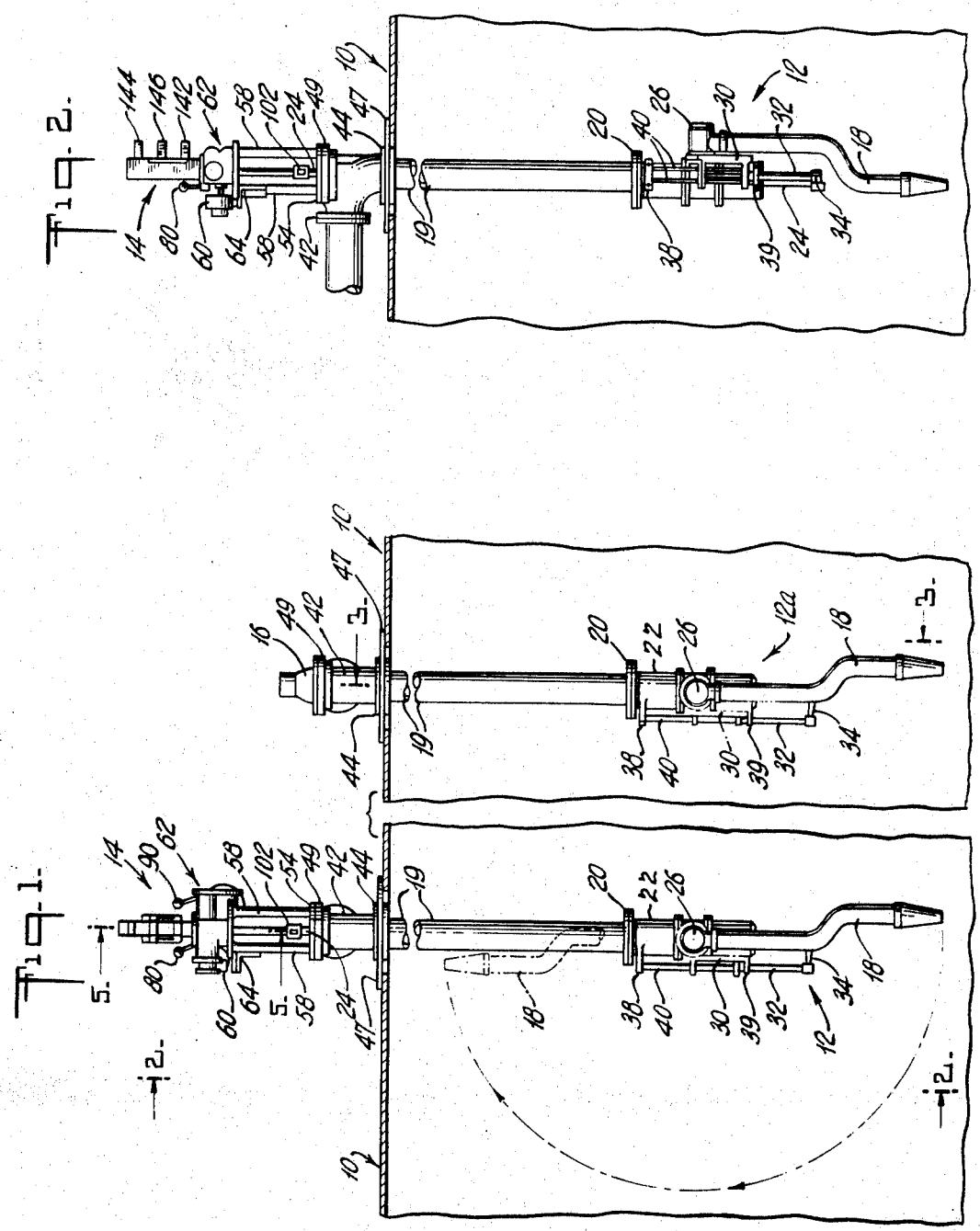

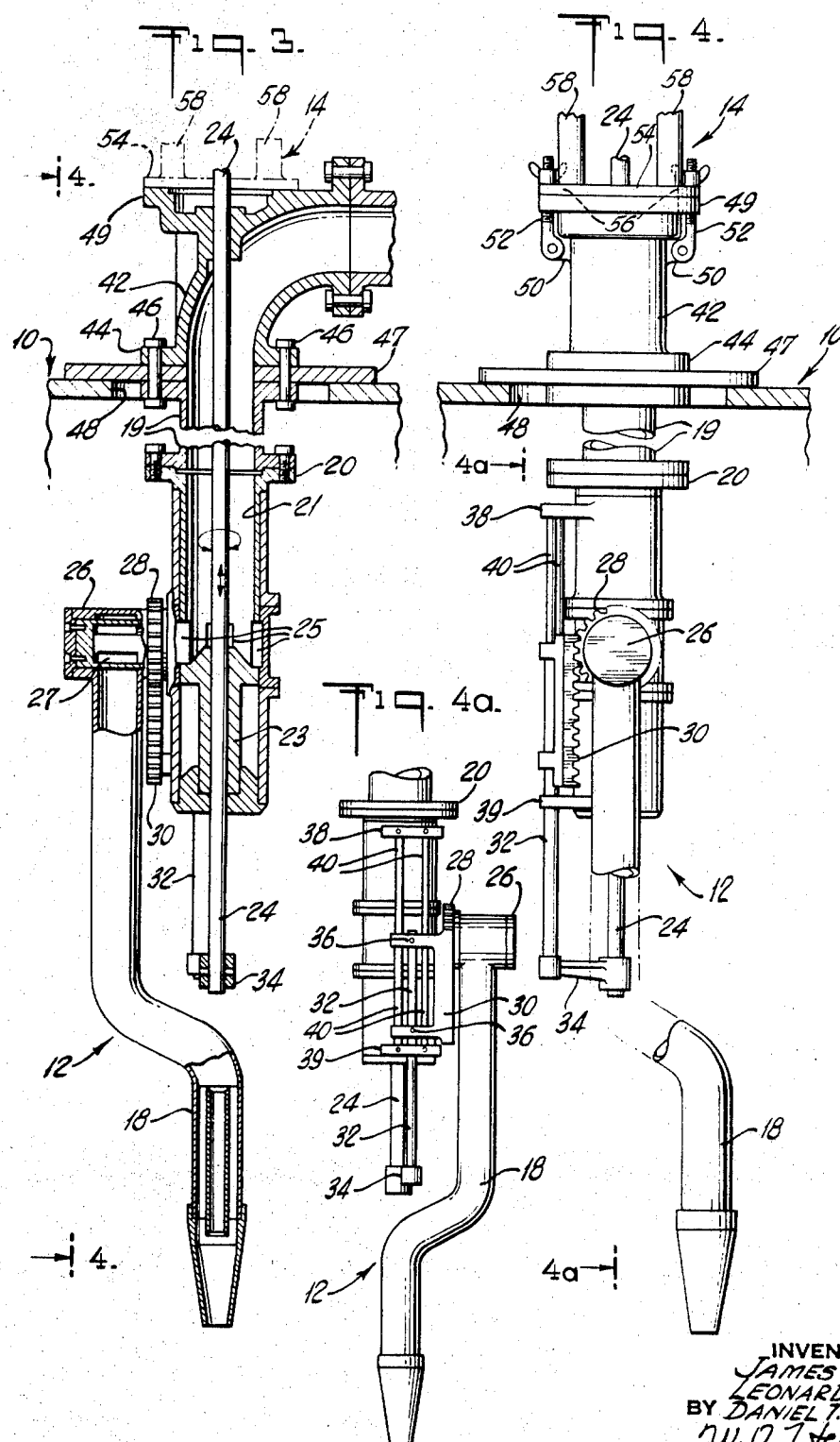

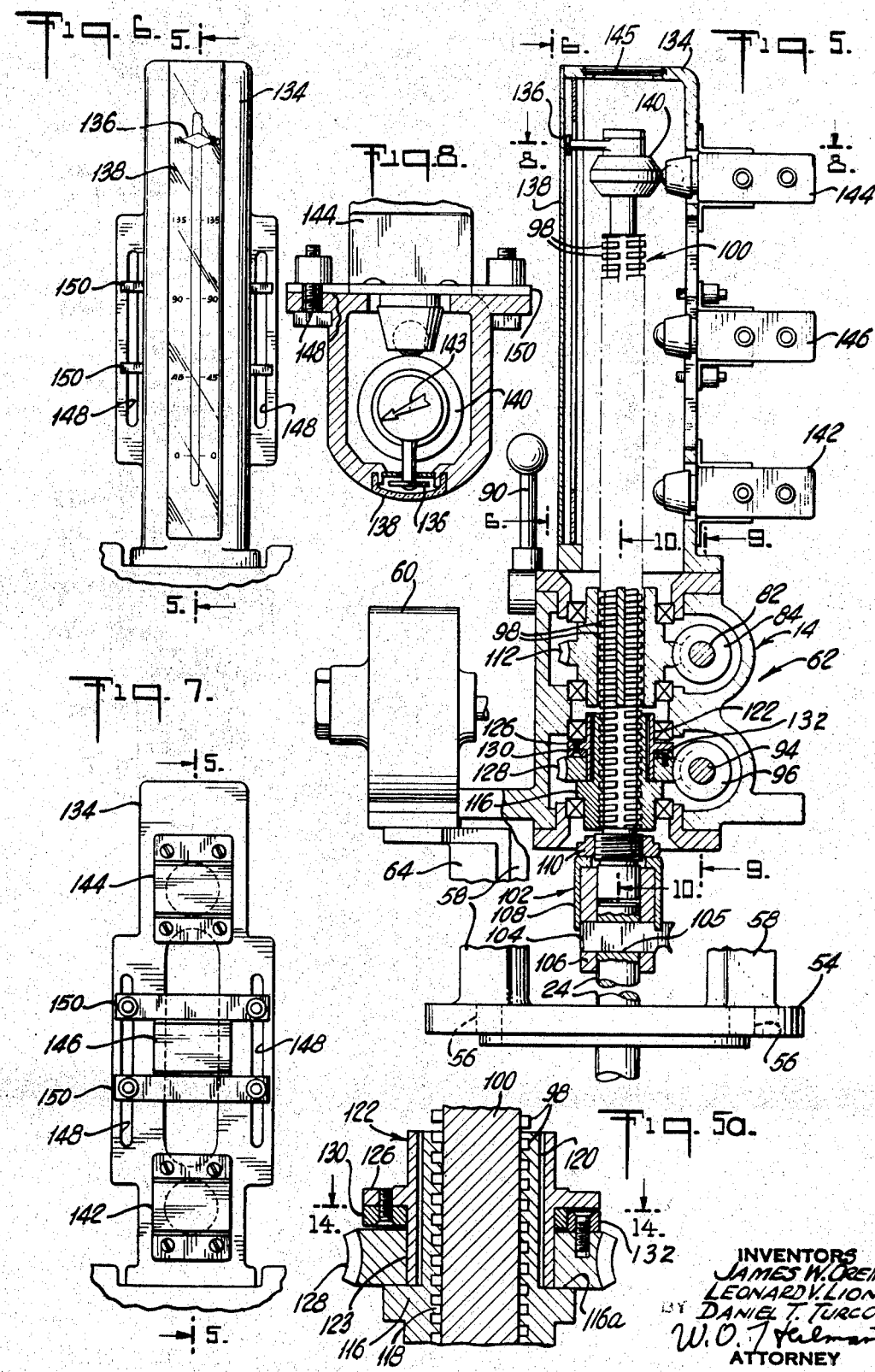

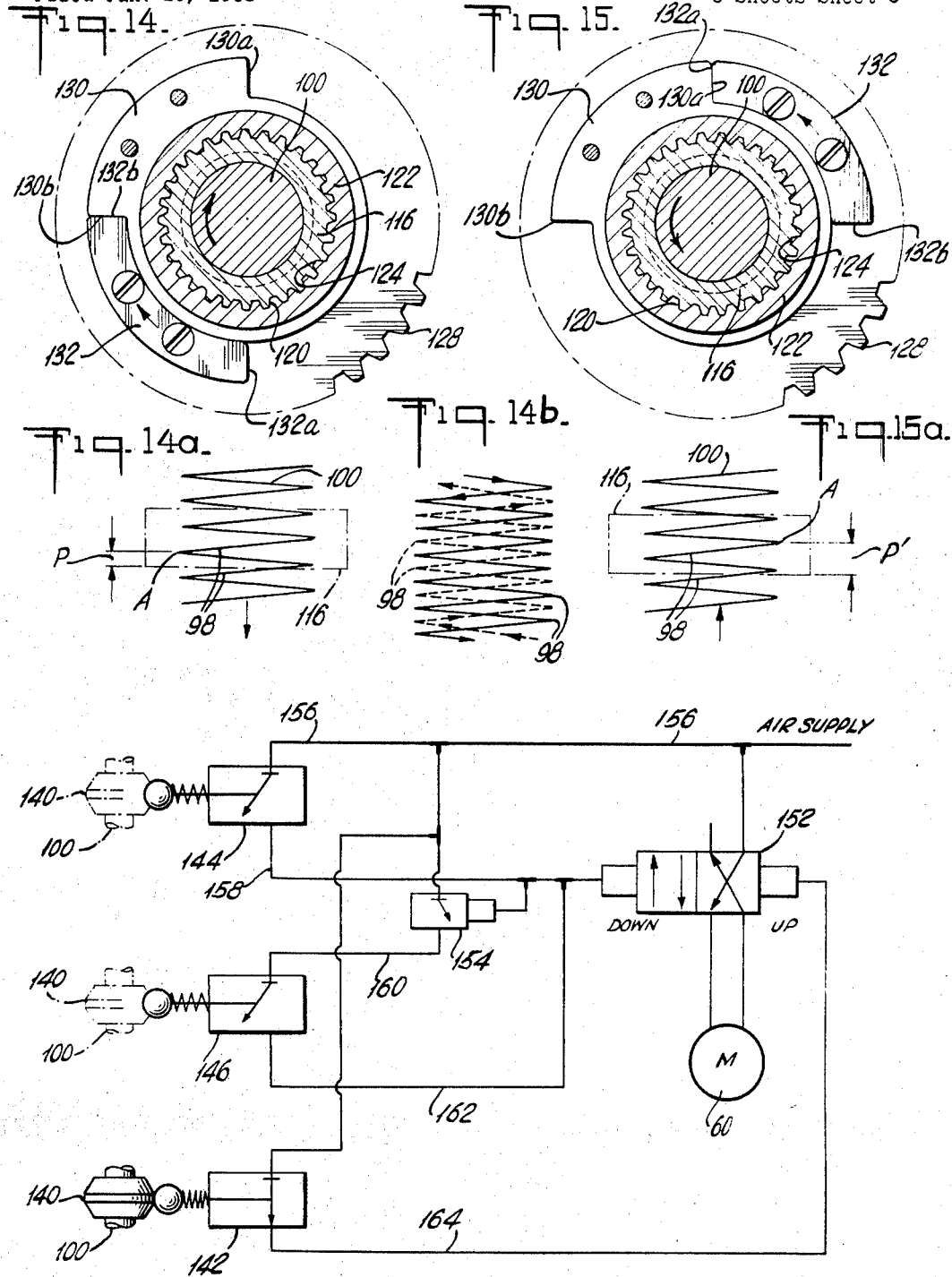

United States Patent Office 3,472,451
Patented Oct. 14, 1969

3,472,451
TANK WASHING APPARATUS
James W. Orem, Red Bank, Leonard V. Lione, Mountainside, and Daniel T. Turco, Glen Rock, N.J., assignors to Butterworth System, Inc., a corporation of Delaware
Filed Jan. 19, 1968, Ser. No. 699,163
Int. Cl. B05b 3/02, 3/14; B08b 3/02
U.S. Cl. 239—227                    18 Claims

ABSTRACT OF THE DISCLOSURE

Tank washing assembly which comprises in combination an oscillating-rotating nozzle mechanism permanently mounted within a tank and a driving-programming mechanism adapted to be mounted on said nozzle mechanism in a manner to control the washing pattern within said tank. A specific feature is the utilization of a single shaft element to impart the rotary pattern and oscillating pattern to the nozzle mechanism from the driving-programming mechanism.

---

The present invention is concerned with a unique apparatus which is particularly adapted for cleaning the interior wall surfaces of a container vessel. The invention is especially concerned with a tank washing apparatus utilizing high pressure jet streams of a cleaning or washing liquid and impinging said jet streams against the interior surfaces of the container vessel. The invention is particularly concerned with a tank washing apparatus wherein the jet streams are directionally controlled and directed so as to effectively clean predetermined areas within the container vessel. The invention, in essence, comprises an improvement over the apparatus described in U.S. 2,917,243 patented Dec. 15, 1959 entitled, "Tank Washing Apparatus," inventor Leonard V. Lione. The invention also comprises an improvement over the apparatus described in copending application Ser. No. 561,088 filed June 28, 1966, now Patent No. 3,379,379, entitled, "Tank Washing Apparatus Having Oscillating Nozzles," inventor James W. Orem.

Specific adaptations of the present invention are a plurality of nozzle mechanisms mounted within a tank, or separate tanks, and a portable driving-programming mechanism which can be permanently or temporarily affixed to each of the nozzle mechanisms in order to control and secure the preferred and desired washing pattern within the tank.

It is known in the art to use various tank cleaning or washing machines which function to wash the entire interior of the tank by securing substantially uniform coverage. While these tank washing machines are satisfactory, they are deficient in that there are many kinds of tanks wherein the soil to be removed is not evenly distributed throughout the tank interior. Thus, the result is that in such tanks when utilizing conventional and known types of tank cleaning machines, the length of time they are sprayed or washed is a function of the time required to clean that part of the tank interior where there is the greatest concentration of soil. The more easily cleaned areas are overwashed, resulting in a waste of time and washing fluid, which materially increases the cost of cleaning the interior of a tank. Furthermore, among other disadvantages due to overwashing, is that the corrosion rate is materially increased.

In tanks where sedimentation occurs such as ship tanks, oil tankers, processing tanks, and the like, the tank bottoms are very often the most difficult part of the tank to clean because of the accumulations of difficultly removable sediments. Thus, in order to satisfactorily clean the tank bottoms, conventional tank cleaning machines must be operated for appreciably longer time periods than is necessary to clean the side and tops. For instance, with a tank having a cube configuration, with the machine positioned in the center of the tank, approximately five-sixths of the cleaning fluid is directed toward the sides and top of the tank and only one-sixth of the cleaning fluid is directed to the bottom of the tank where the maximum washing is required. Other improved machines such as the one described in U.S. Ser. No. 561,088, now Patent No. 3,379,379, can be programmed to wash a selected area within a tank.

However, the present apparatus by its controlled directional flow will be able to wash the entire tank and may also be programmed to concentrate on those specific areas of the tanks where the maximum amount of washing is required. Thus, washing time and fluid will only be used on those less soiled areas of the tanks to the extent necessary to effectively and efficiently clean these less soiled areas. As indicated, this will result in large savings in the cleaning fluid required, will reduce the time required for thoroughly cleaning the interior of a tank, and will reduce corrosion.

A further development in the tank washing field for which the present invention is particularly adapted is for cleaning the large tanks of mammoth, super or jumbo tankers or ships now in service or under construction. By utilizing the present invention by permanently positioning one or more nozzle mechanisms at desired positions within the respective tank and utilizing the portable driving-programming mechanism to control the washing pattern of said nozzle assemblies, greatly improved results are secured at substantially lower overhead, material and labor charges.

The apparatus of the present invention may be readily understood by reference to the drawings illustrating certain embodiments of the same. FIGURE 1 illustrates a front view of a tank with one nozzle assembly in operation in combination with the programming-driving assembly and a second nozzle assembly in an idle position with a protective cap provided. FIGURE 2 is a section on lines 2—2 of FIGURE 1. FIGURE 3 is an enlarged section of the drive unit taken on the lines 3—3 of FIGURE 1. FIGURE 4 is an end view of FIGURE 3 on lines 4—4 of FIGURE 3. FIGURE 4a is a fragmentary side view of FIGURE 4 on lines 4a—4a of FIGURE 4. FIGURE 5 is an enlarged section of the drive unit taken on the lines 5—5 of FIGURE 1.

FIGURE 5a is an enlarged fragmentary view of a portion of FIGURE 5. FIGURE 6 is a fragmentary end view of the housing of FIGURE 5 showing the indicator and indicia on lines 6—6 of FIGURE 5. FIGURE 7 is a rear view of FIGURE 6 showing the supports for the valves. FIGURE 8 is a plan section on the lines 8—8 of FIGURE 5. FIGURE 9 is a section on the lines 9—9 of FIGURE 5. FIGURE 10 is a section on the lines 10—10 of FIGURE 5 with certain parts omitted for clarity.

FIGURE 11 is a plan section on lines 11—11 of FIGURE 9. FIGURE 12 is a plan section on lines 12—12 of FIGURE 9. FIGURE 13 is an exploded perspective view of the screw elevating driving mechanism shown in FIGURES 5a, 14 and 15. FIGURE 14 is a plan section on lines 14—14 of FIGURE 5a whereby the nut is rotating clockwise and the screw is rotating clockwise at a different rate. FIGURE 14a is a schematic side view of FIGURE 14. FIGURE 14b is a schematic of the helical path of the wash in a downward and in an upward motion. FIGURE 15 is a view similar to FIGURE 14 whereby the nut is rotating counterclockwise lowering the screw. FIGURE 15a is a schematic side view of FIGURE 15 while FIGURE 16 is a schematic of the valve operating means.

Referring specifically to FIGURE 1, a tank 10, as for example, a tank of a supertanker, is shown having mounted therein a nozzle wash unit mechanism 12 and a nozzle wash unit mechanism 12a. Attached to the top of nozzle mechanism 12 is a driving-programming mechanism 14. Nozzle mechanism 12 and nozzle mechanism 12a are entirely similar. There is attached to the top of mechanism 12a a protective cover cap 16 which is used when the unit is not in service.

The nozzle mechanism 12 is suitably affixed by any suitable means within tank 10 as by means of a flange 47 which is attached to water housing inlet 42 through flange 44 and which comprises an integral part of stationary housing 19 which extends within the tank. Stationary housing 19 has a flange assembly 20 at its lower end whereby a rotating housing 22 is attached thereto by means of bearing surface or sleeve 21. Stationary housing 19 has a lower sleeve element 21 (see FIGURE 3) which functions as a bearing surface for rotating housing 22. A hub 26 is rigidly affixed to nozzle 18 and provides communication from within the interior of rotating housing 22 to within nozzle 18. The nozzle 18 is affixed and in communication with said hub and is adapted to oscillate in a vertical plane from 0° to 180° as shown or any selected arc therein.

For purposes of description of the drawings it is assumed that the longitudinal axis of the housings 22 and 19 is perpendicular and thus the nozzle 18 will oscillate in a vertical plane. It is to be understood, however, that the axis of the housings may be at any angle or attitude from horizontal to vertical and the relative movements of other elements of the respective assemblies varied in accordance thereto. Thus, the nozzle 18 will oscillate on an axis which is perpendicular to the longitudinal axis of the housings 19 and 22.

Rotating housing 22 is adapted to rotate through 360°. A rack 30 is illustrated, the function of which will be hereinafter described. Nozzle 18 is shown in the upper or 180° position by a broken line. Stationary housing 19 extends through the top of the tank 10 and is attached at its upper end to water inlet housing 42. Water inlet housing 42 has attached at its upper end a flange 49 upon which the driving-programming mechanism is mounted. The driving mechanism has a bottom flange 54 which is adapted to be attached to upper flange 49 of housing 42. A programmed shaft 24 (see FIG. 2) is concentrically disposed within stationary housing 19 and rotating housing 22 and extends from the top of stationary housing 19 and is adapted to be coupled to driving-programming mechanism assembly 14 by means of a coupler 102. Legs 58 extend from bottom flange 54 upwardly and support driving-programming housing 62. An air motor or equivalent driving means 60 is suitably supported by an angle support 64 attached to housing 62. In operation housing 22 rotates through 360° thereby rotating nozzle 18, and at the same time nozzle 18 will oscillate in a vertical plane through a predetermined arc as hereinafter described.

Referring specifically to FIGURE 2 which is a view 2—2 of FIGURE 1, the water inlet housing 42 is more clearly illustrated. Air control valves, the function of which will be hereinafter described, 142, 146 and 144 are also shown as part of the driving-programming mechanism assembly. Elements similar with respect to FIGURES 1 and 2 are similarly designated. It is to be noted that lower end of nozzle 18 in the position shown in FIGURE 2 lies in the same vertical plane as housing 22.

Referring specifically to FIGURE 3 which is an enlarged section 3—3 of FIGURE 1, programmed shaft 24 is shown extending through bottom flange 54 through upper flange 49, through stationary housing 19, through rotating housing 22 and having attached at its lower end thereof a bracket 34. A flange 47 secures the nozzle wash unit mechanism to the tank which unit is positioned within the tank through tank opening 48. Screws 46 secure water inlet housing 42 to stationary housing 19, the other end of housing 19 being secured by means of flange assembly 20 by means of sleeve 21 to rotating housing 22. The sleeve on housing 19 provides an outer bearing surface about which housing 22 rotates and is designated as bearing surface 21. A bearing element 23 within sleeve 21 is provided for programmed shaft 24. A connecting rod 32 connects rack 30 to shaft 24 by means of bracket 34. A hub 26 is provided on nozzle 18 and a pinion 28 is secured to hub 26. Pinion 28 meshes with rack 30. Ports 25 are provided for water passage from within sleeve 21 to nozzle 18. Thus, the water passage is through water housing 42, through stationary housing 19, through sleeve 21, through ports 25 of sleeve 21, through ports 27 of rotating housing 22 and into hub 26 and thence to nozzle 18.

Rotation of programmed shaft 24 will provide rotary motion to housing 22 and vertical movement of programmed shaft 24 will oscillate nozzle 18 by means of rack 30 and pinion 28 which is securely affixed to the hub nozzle 26.

Referring specifically to FIGURE 4, which is a view 4—4 of FIGURE 3, legs 58 of driving mechanism assembly 14 are shown, along with shaft 24 which shaft extends through upper flanges 49 and 54. Swing bolts 52 attached to bosses 50 are provided for attaching the driving mechanism 14 to the water inlet housing 42. Slots 56 are provided in bottom flange 54 in order to seat the swing bolts and to secure a tight fit.

Bosses 38 and 39 are rigidly affixed on rotating housing 22, between which are affixed two guide bars 40 along which rack 30 moves in a vertical direction. Connecting rod 32 which is rigidly affixed to bracket 34 and extends through an opening in boss 39 and is attached to rack 30. Thus, as shaft 24 moves upwardly and downwardly in a vertical direction rack 30 is also moved upwardly or downwardly meshing with pinion 28 thus oscillating hub 26 and nozzle 18. Screws 36 secure connecting rod 32 to rack 30. Thus, when programmed shaft 24 is moved vertically, connecting rod 32 will be likewise moved vertically since 24 is rigidly affixed to 32 by means of bracket 34. Pinion 28, which is rigidly affixed to hub 26, will be rotated by the intermeshing of the rack 30 and the pinion 28 to secure the oscillation of nozzle 18.

Referring specifically to FIGURE 4a, which is a fragmentary side view of FIGURE 4 on line 4a—4a of FIGURE 4, guide rods 40 are shown secured to bosses 38 and 39. Pinion 28 is attached to hub 26 as shown. Bracket 34 is shown attached to the lower end of programmed shaft 24 and attached to connecting rod 32, which in turn is attached to rack 30.

Referring specifically to FIGURE 5, which is an enlarged section of the programming-driving unit taken on lines 5—5 of FIGURE 1, programmed shaft 24 is shown extends through an opening in boss 39 and is attached nism and is attached to the lower end of splined lead screw 100 having threads 98. The upper end of shaft 24 has a slot 105 through which key or cotter pin member 104 is positioned to securely affix shaft 24 to lead screw 100. An inner sleeve 106 seats about the upper end of shaft 24 and the pin 104 extends therethrough securing a tight connection between the respective elements. An outer sleeve 108 seats in a slot in pin or latch member 104 so as to prevent disengagement. Nut 110 is adapted to secure outer sleeve 108 in the slot on pin member 104. These elements comprise the complex assembly 102.

Air motor 60 is shown supported by bracket element 64 attached to housing 62. Threaded nut 116 functions to elevate and lower splined lead screw 100. Nut 116 is rotatable and is axially fixed. A first shaft 82 functions to support right-hand worm 84 which drives a splined worm gear or splined element 112 to rotate splined lead screw 100. A second shaft 94 functions to support left-hand worm 96. Gear 128 is driven by worm gear 96 to raise and lower the shaft 100 through threaded rotatable nut 116 in a manner as hereinafter described. While worm gears are described, other equivalent mechanisms such as spur gears may be utilized. A segment 130 is secured to a flange 126 of an intermediate sleeve 122. A segment 132 is secured to a floating gear 128. (See FIGURE 13). Valves 144, 146 and 142, supported on housing 134, serve to control the vertical motion of lead screw 100 as will be hereinafter described. Housing 134 has an indicia window 138 and an opening 145 in the top thereon. Fasteners 150 (see FIGURE 6) serve to control the adjustment of intermediate air control valve 146. Control valves 142 and 144 may also be made adjustable. Spline lead screw 100 has a cam 140 secured at the top thereof and a pointer 136 is journaled on the upper end of the lead screw 100.

Referring specifically to FIGURE 5a which is an enlarged, fragmentary section of FIGURE 5, splined lead screw 100 contains threads 98. Rotatable nut 116 has threaded portions 118 which mesh with the threads 98 of screw 100. Rotatable nut 116 is splined at 120 to intermediate sleeve 122. (See FIG. 13). The sleeve 122 has a flange 126. This intermediate sleeve 122 also has a splined portion 124 which is engaged with the splined portion 120 of rotatable nut 116.

FIGURE 6 is a fragmentary end view of the housing 134 of FIGURE 5 with the indicator and indices taken on line 6—6 of FIGURE 5. Housing 134 has slots 148 so as to permit the adjustment and fastening of intermediate valve 146.

FIGURE 7 is a rear view of FIGURE 6 showing more clearly the support structure for the valves. FIGURE 8 is a plan section on the lines 8—8 of FIGURE 5 which further illustrates the structure. An arrow 143 is on lead screw 100 so as to visibly indicate the azimuth or heading of nozzle 18 through opening 145 of housing 134. Driving power is from the reversible motor through the motor shaft to the motor shaft worm 66 mounted on the motor shaft (See FIGURE 10.) The worm 66, in turn, rotates worm gear 68 which rotates stub shaft 70 and, in turn, rotates worm 72. Worm 72 is meshed with worm gear 76 mounted on a third shaft 74 so as to rotate the same. The rotation of shaft 74 may be imparted to said first shaft 82 when clutch handle 80 is actuated to engage clutch 78 so as to engage the third shaft 74 to the first shaft 82. Right-hand worm 84 mounted on shaft 82 engages splined worm gear or splined element 112, which splined worm gear 112 is splined to lead screw 100 to rotate the same. (See FIGURE 11.) Thus, when clutch 78 is engaged, a continual rotary motion is imparted to spline lead screw 100 which, in turn, is adapted to rotate shaft 24 to continuously rotate housing 22. When the motor is reversed, as will be hereinafter described, the direction of rotation of housing 22 will also be reversed.

When clutch 78 is engaged and clutches 88 and 168 are disengaged, nut 116 will not rotate. Rotary motion will be imparted to lead screw 100 by means of worm 84 and spline element 112. The lead screw will also move vertically due to the fact that, although rotatable nut 116 is not rotating, screw 100 will be threaded therethrough by the rotation imparted by worm 84.

Angular motion is imparted to nozzle 18 by moving clutch handle 90 so as to engage clutch 88 and thereby engage floating first gear 86 which is mounted and floats on first shaft 82. Gear 86 is engaged with a second gear 92 in a manner to rotate the same. Second gear 92 is mounted on second shaft 94 which contains at one end thereof a beveled third gear 176 which is engaged with a fourth gear 174, the action of which will be hereinafter described. (FIGURE 12.) The number of gear teeth on floating first gear 86 and on second gear 92 are different and may vary such as in the range of from a ratio of 1–1 to 1–8, preferably in the range from 1–1 to 1–4. A preferred ratio is to have the number of teeth on floating first gear 86 as compared with the teeth on second gear 92 of 2 to 3. It is to be understood that under certain conditions the ratios may vary from 1–1 to 8–1, such as 4–1.

The rotation of second shaft 94 will rotate a second or left-hand worm 96 in a manner to control raising or lowering of screw 100 depending upon the direction the reversible motor is operating in a manner as hereinafter described. Second worm 96 as illustrated is a left-hand worm. It is to be understood that first worm 84 could be a left-hand worm and second worm 96 a right-hand worm. Also, either or both worms may be right or left, if one is on the opposite side of the worm gear. The respective gears may be varied so that when gear 128 is rotating clockwise being driven by second worm 96 (FIGURE 12) the splined screw 100 may be raised or lowered. For the purpose of description, it is assumed that second worm 96 is operating in a manner to move floating gear 128 in a clockwise direction so as to elevate spline lead screw 100. The rate of change of elevation is also a function of the rotation of the screw 100 imparted by first worm 84.

The drawings illustrate the mechanism wherein floating gear 128 and lead screw 100 are rotating in the same direction at a different rate of rotation thereby securing at least some vertical motion. It is to be understood that it is within the concept of the present invention to rotate these respective elements in opposite directions.

Threaded rotatable nut 116 shown in FIGURE 5 and further illustrated in FIGURE 5a, which is driven by floating gear 128, is further illustrated in FIGURE 13. Referring particularly to FIGURE 13, threaded rotatable nut 116, which when rotating functions to elevate and lower screw 100, has an internal thread portion 118 meshing with threads 98 of lead screw 100. The outer portion of rotatable nut 116 is splined at 120. An intermediate sleeve 122 is internally splined at 124 so that intermediate sleeve 122 can be splined to nut 116 by means of splines 120 and 124. While the intermeshing of elements 123 and 116 are described with respect to splines, it is to be understood that other equivalent means such as a key and groove structure may be utilized, so as to secure equivalent mechanical results. Intermediate sleeve 122 has a flange portion 126 thereon. Floating gear 128 driven by second worm 96 floats on outer sleeve portion 123 of intermediate sleeve 122 and floating gear 128 rests on shoulder 116a of rotatable nut 116. A first segment 130 is secured to the underside of flange member 126 of intermediate sleeve 122. A second segment 132 is secured to the upper portion of floating gear 128. It will be noted that floating gear 128 is driven by second worm 96 which, in turn, was driven by first gear 86 and second gear 92. (See FIGURE 9.) It is also noted that the gear ratio of first gear 86 and second gear 92 is approximately a 3:2 ratio. Screw 100 is threaded in threads 118 of rotatable nut 116 to impart motion to said screw. Floating gear 128 is driven by means of second worm 96 through sleeve 122. Upon reversal of the motor a nondriving lag will occur between floating gear 128 and rotatable nut 116 as a function of the time it will require first segment 130, attached to sleeve 122, to make contact with second segment 132 affixed to floating gear 128.

Referring particularly to FIGURE 14 as shown floating gear 128 (FIGURE 12) is driven clockwise by second worm 96 whereby face section 132b (FIGURE 13) of second segment 132 strikes face section 130b of first segment 130 thereby driving first segment 130 clockwise. Since first segment 130 is secured to intermediate sleeve 122 it rotates sleeve 122 clockwise. Also, since intermediate sleeve 122 is splined to rotatable nut 116, it drives rotatable nut 116 clockwise. It will be noted that lead screw 100 is also rotating clockwise being driven by splined element or splined gear 112. (See FIGURE 11.) Since rotatable nut 116 is rotating at slower rate than lead screw 100 due to the ratio of gears on first gear 86 and second gear 92, the downward movement of lead screw 100 is being retarded the purpose of which is to give a fine helical wash pattern from nozzle 18 in a wash cycle. Conversely, the upward motion of screw 100 is imparted by the reverse rotation of a splined element 112 reversing the direction of screw 100 (See FIGURE 11) due to the action of reversing motor 60.

As floating gear 128 is rotated clockwise, second segment 132 will likewise be rotated clockwise being firmly affixed to floating gear 128. Thus, face surface 132b of second segment 132 will contact face surface 130b of first segment 130 which is rigidly affixed to flange 126 of intermediate sleeve 122. By reference to FIGURES 13, 14 and 15, it is evident that upon reversal of the motion of floating gear 128 to counterclockwise there will exist a time lag before face surface 132a of second segment 132 strikes face surface 130a of first segment 130. Thus, there will also exist a time lag between the rotation of rotatable nut 116 and the lead screw 100. Continued rotation counterclockwise will bring the lead screw 100 up but, since the rotatable nut 116 is rotating at a slower speed than the screw 100, the screw is being retarded in its upward direction to give a fine helical pattern in its upward motion. By securing this time lag the washing pattern will be in a different phase on the upward movement as compared with the downward movement of screw 100. Thus, on upward movement the washing stream path is not superimposed on the washing path secured on the downward movement. It is preferred that the first segment 130 and the second segment 132 be 90°.

FIGURE 14a is a schematic drawing of the operation shown in FIGURE 14 and FIGURE 15a is a schematic of operation shown in FIGURE 15. FIGURE 14a illustrates a schematic sideview of FIGURE 14 showing the relative position of a point A, at its lowest point, of the helix of threads 98 relative to the rotatable nut 116 by dimension P. As gear 128 moves from a position shown in FIGURE 14 to a position shown in FIGURE 15, the one end of segment 132 will strike one end of first segment 130 to start rotating nut 116 counterclockwise. During this lost motion period of the time it takes the other end of segment 132 to reach he position of point A from FIGURE 14 to position of point A on FIGURE 15, the threads 98 of lead screw 100 are positioned out of phase relative to rotatable nut 116 by dimension shown in FIGURE 15a as P'. The lost motion position is equivalent to about 180° before the other end of second segment 132 strikes the other end of segment 130. Rotatable nut 116 has not yet moved but the point A of lead screw 100 has moved from the position of 14a to the position of 15a (out-of-phase position) by virtue of screw 100 being rotated counterclockwise by splined gear 112. (See FIGURE 11.) Further movement of second segment 132 of FIGURE 15 will be moved counterclockwise by first segment 130 thereby retarding the upward movement of the screw 100. It will be noted (FIGURE 14c) that the helical path of point A of the screw 100 on its upward direction (shown in dotted lines) are out of phase to the path of its downward direction and will follow a path intermediate of its downward path thereby preventing any rewashing of the previous path.

As previously described, with clutch 88 in engagement a fine washing pattern as shown in FIGURES 14 and 15 is secured. A coarse pattern of wash can be secured by two methods. A first method is to disengage clutch 88 thereby stopping rotation of the rotatable nut 116. The lead screw 100 being rotated by first worm 84 will move more rapidly in a vertical direction since the rotatable nut 116 is not rotating in the same direction which, as pointed out heretofore, tends to retard the overall vertical movement.

First worm 84 by means of gear 112 not only imparts a rotary motion to screw 100 but also imparts a first movement to screw 100 along the longitudinal axes of the discharge due to being threaded in rotatable nut 116. Second worm 96 by means of rotatable nut 116 may also impart a second movement to screw 100 along the longitudinal axes. These first and second movements may be additive or subtractive to produce a resultant combined movement.

A second method of securing a coarse pattern in accordance with the present invention is to disengage clutch 88 and to engage clutch handle 170. This will engage handle 166 with second gear 92 through a third gear 176 and a fourth gear 174. (See FIGURE 12.) Thus, manual operation of second worm 96 is secured through the described gear train.

Referring specifically to FIGURE 16 a schematic diagram is shown for the operation and control of the reversible air motor. While any suitable sensing means may be utilized for securing control and reversal of the motor operation, and the extent to which screw 100 is raised and lowered such as by means of electrical pickup means, photoelectric cells and the like, one very desirable method is the utilization of the method illustrated in FIGURES 5 and 16. Referring specifically to FIGURE 5, valve or sensing means 146 may be moved upwardly to secure, in essence, the upward position of sensing valve 144 which corresponds to the nozzle 18 being at 180°. On the other hand, sensing valve 146 may be moved downwardly to approximately the position of lower sensing means 142. The position of sensing valve 146 as shown would mean that cam or tripper 140 would reciprocate between valves 146 and 142 corresponding to a nozzle oscillation between 6:00 o'clock and 9:00 o'clock. It is to be understood that, if desired, sensing valve means 142 and 144 could also be movable to secure more flexibility in the oscillation of the nozzle. Referring specifically to FIGURE 16, a typical schematic layout is given to secure the operation of the motor so as to have cam 140 operate between the respective sensing means.

When cam 140 reaches its uppermost position, air from supply line 156 is permitted to go to line 158 via valve 144 thence to 4-way valve 152 which reverses motor 60 to start screw 100 downwardly while at this same time valve 154 activates valve 146 via line 160. Cam 140 on the downstroke strikes valve 146 to the down position of 4-way valve via line 162. Screw 100 continues to travel down until cam 140 actuates valve 142. This reverses the 4-way valve 152 via line 164 to start screw 100 going up by reversing the motor 60. When 140 actuates valve 146 it reverses the 4-way valve 152 via line 162 to start screw 100 downwardly. Thus cam 140 will travel between valves 142 and 146. It will be noted that at the initial first cycle the screw 100 travels between valve 142 and 144 which rotates the nozzle 18 approximately from 0° to 180° as shown in the full line and DOT-DASH position of nozzle of FIGURE 1. In all subsequent cycles of screw 100 it reciprocates between valves 142 and 146. Since valve 146 is about midway between valves 142 and 144 the nozzle 18 will oscillate approximately 90°. By adjusting the vertical distance of valve 146, all subsequent strokes after the initial stroke which are between valves 142 and 146 any desired angle within 180° can be accomplished. From the foregoing it is evident that great flexibility of operation may be secured by the adjustments of the respective control valves. For instance, the initial cycle or cycles may be between valves 142 and 144 representing a nozzle cycle of 180° and subsequent cycles between valves 142 and 146 representing nozzle oscillation between 0° and 90°. The nozzle arc may be adjusted so as to oscillate between 6 o'clock and 9 o'clock or between 7 o'clock and 10 o'clock or any arc segment between 0° and 180° (6 o'clock and 12 o'clock).

What is claimed is:

1. A tank washing assembly which comprises in combination: (1) a nozzle washing mechanism adapted to be disposed within a tank; (2) a driving-programming mechanism adapted to be affixed to said nozzle washing mechanism, said nozzle washing mechanism comprising; (3) a rotatable housing one end of which is adapted to be in communication with a source of supply of washing fluid; (4) a nozzle hub positioned on the other end of said rotatable housing and in communication with the interior of said rotatable housing; (5) a nozzle positioned on said nozzle hub the interior of which is in communication with the interior of said nozzle hub, said nozzle and nozzle hub being adapted to oscillate about a second axis which is perpendicular to the longitudinal axis of said rotatable housing; (6) a programmed shaft concentrically disposed within said rotatable housing, the one end of which is adapted to be securely affixed to; (7) a lead screw concentrically disposed along said longitudianl axis and an element of said driving-programming mechanism, and the other end of said programmed shaft extending without said rotatable housing and having attached thereto; (8) a bracket; (9) a hub gear positioned on the exterior of said nozzle hub; (10) oscillating connecting means for transmitting the movement of said programmed shaft along the longitudinal axis to said hub gear in a manner to oscillate said nozzle hub as a function of the movement of said programmed shaft, whereby said nozzle will be oscillated on said second axis perpendicular to said longitudinal axis; (11) rotating connecting means for transmitting rotational movement of said programmed shaft to said rotatable housing, whereby as said programmed shaft is rotated said rotatable housing will be rotated, said driving-programming mechanism comprising said lead screw and; (12) a programming housing having concentrically disposed therein said lead screw one end of which is affixed to said one end of said programmed shaft; (13) reversible motor means adapted to supply a driving force by suitable means to; (14) a first worm suitably meshed with said lead screw by means of; (15) a splined gear in a manner to rotate said lead screw and to permit movement of said lead screw therethrough, said reversible motor means also being adapted to supply a driving force by suitable means to; (16) a second worm suitably meshed with; (17) a rotatable internally threaded nut, the threads of which mesh with the threads of said lead screw in a manner that when said lead screw is rotated or when said rotatable nut is rotated movement of said lead screw will occur along said longitudinal axis; whereby as said first worm and said second worm are actuated said nozzle will rotate about said longitudinal axis and will oscillate about said second axis.

2. Assembly as defined in claim 1 wherein said oscillating connecting means for transmitting the movement of said programmed shaft along the longitudinal axis to said hub gear comprises; (18) a connecting rod one end of which is affixed to said bracket, the other end of said connecting rod being attached to; (19) a rack the teeth of which mesh with said hub gear, whereby as said programmed shaft is moved along said longitudinal axis said hub will be oscillated about said second axis perpendicular to said longitudinal axis.

3. Assembly as defined by claim 1 wherein said rotating connecting means for transmitting the rotational movement of said programmed shaft to said rotatable housing comprises: (18) a connecting rod one end of which is attached to said bracket; (20) bosses affixed to the outer surface of said rotatable housing, said connecting rod passing through said boss, whereby as said programmed shaft rotates said rotatable housing will rotate.

4. Assembly as defined by claim 1 wherein the driving force supplied to said first worm from said motor means is by motor means rotating; (21) a first shaft which support said first worm.

5. Assembly as defined by claim 4 wherein said means for supplying a driving force to said second worm comprises said first shaft having mounted thereon; (22) a first gear intermeshing with; (23) a second gear mounted on; (24) a second shaft which second shaft also supports said second worm.

6. Assembly as defined by claim 5 wherein the ratio of teeth on said first gear to the teeth on said second gear varies from about 4–1 to 1–4.

7. Assembly as defined by claim 1 wherein said rotatable internally threaded nut comprises: (25) a cyclindrical element internally threaded to receive said lead screw and having a shoulder thereon, said cylindrical element being externally splined between said shoulder and the one end thereof; (26) a floating gear element adapted to be driven by said second worm, said floating gear element being characterized by floating on said spline along said shoulder, said floating gear element characterized further by having; (27) a second segment rigidly affixed to its upper face; (28) an internally splined sleeve the spline of which is adapted to mesh with the external spline of said cylindrical element, said internally splined sleeve having a should to which is affixed; (29) a first segment on the lower surface thereof, whereby when the motor is reversed a delay in transmission of power will occur between said floating gear element and said cylindrical element as a function of the time required for said second segment to make contact with said first segment.

8. Assembly as defined by claim 1 wherein; (30) a first clutch is interposed between said first worm and said second worm in a manner that when said first clutch is disengaged no power will be transmitted to said second worm from said reversible motor; (31) a second clutch adapted to engage said second worm with power transmitted by suitable means from; (32) a manually operated element whereby said motor will supply power to said first worm and manual power is supplied to said second worm.

9. A tank washing assembly which comprises in combination: (1) a nozzle washing mechanism adapted to be disposed within a tank; (2) a driving-programming mechanism adapted to be removably positioned without said tank with respect to said washing mechanism, said nozzle washing mechanism comprising; (3) an upper stationary housing and; (4) a lower rotating housing; (5) a nozzle hub positioned on said rotating housing and in communication with the interior of said rotating housing; (6) a nozzle positioned on said nozzle hub the interior of which is in communication with the interior of said nozzle hub, said nozzle being adapted to oscillate in a vertical plane; (7) a programmed shaft concentrically disposed and extending through said stationary housing and said rotating housing, the one end of which is adapted to be attached to said driving-programming mechanism and the other end of which extends without said rotating housing, has attached thereto; (8) a bracket; (9) a gear positioned on the exterior of said hub; (10) guide rods rigidly affixed to the exterior of said rotating housing; (11) a gear rack the teeth of which mesh with said gear and movable along said guide rod; (12) a connecting rod the lower end of which is attached to said bracket and the upper end of which is affixed to said gear rack whereby, as said programmed shaft is vertically moved, said gear rack will be vertically moved causing the nozzle hub to be oscillated thereby oscillating said nozzle in a vertical plane and whereby, as said programmed shaft is rotated, said rotating housing will be rotated, said driving-programming mechanism comprising; (13) a housing having vertically concentrically disposed therein; (14) a splined and threaded screw the lower end of which is adapted to be removably rigidly affixed to said programmed shaft by suitable means in a manner to rotate said programmed shaft and to also move the same in a vertical direction; said housing having mounted therein; (15) reversible motor means adapted to supply a driving force by suitable gear means to; (16) a first worm gear suitably meshed with said splined and threaded screw in a manner to rotate the same, said motor means also adapted to rotate; (17) a second worm gear which is adapted to rotate; (18) a threaded rotatable nut about said splined and threaded screw in a manner tending to raise or lower said splined and threaded screw, whereby as said first worm gear and said rotatable nut are rotated, a rotary motion will be imparted to said programmed shaft and also a vertical movement imparted to said programmed shaft so as to rotate said nozzle and impart an oscillating movement thereto.

10. Assembly as defined by claim 9 wherein said housing contains; (19) an upper sensing means and; (20) a lower sensing means adapted to control the upward movement and downward movement as said splined screw by initiating reversal of said motor means.

11. Assembly as defined by claim 10 wherein the respective positions of said sensing means are adjustable, thereby controlling the arc through which said nozzle oscillates.

12. Assembly as defined by claim 9 wherein said first worm gear and said second worm gear are rotated in opposite directions.

13. Assembly as defined by claim 12 wherein said first worm gear and said second worm gear are rotated at different speeds.

14. Assembly as defined by claim 9 wherein said first gear is mounted on; (21) a first supporting shaft and motion is imparted to said first worm gear by said motor driving said first shaft, said first shaft having mounted thereon; (22) a first spur gear, the gear teeth of which mesh with; (23) a second spur gear mounted on; (28) a second supporting shaft also supporting said second worm gear.

15. Assembly as defined by claim 14 wherein said first spur gear and said second spur gear have a different number of gear teeth thereon.

16. Assembly as defined by claim 15 wherein the ratio of the teeth on said first spur gear and said second spur gear is 3:2.

17. Assembly as defined by claim 13 wherein; (29) a first clutch means is interposed between said motor and said first worm gear, wherein; (30) a second clutch means is interposed between said first supporting shaft and said first worm gear, whereby said first worm gear may be rotated and said second worm gear not rotated when said second clutch means is disengaged and whereby the entire programming mechanism is stationary when said first clutch means is disengaged.

18. Assembly as defined by claim 13 wherein said second supporting shaft has mounted thereon at one end thereof; (31) a gear adapted to be rotated manually when said second clutch is disengaged and said bevel gear is engaged with; (32) a handle means wherein a third clutch means (33) positioned between said bevel gear and said handle means is engaged.

References Cited
UNITED STATES PATENTS

| | | | |
|---|---|---|---|
| 2,917,243 | 12/1959 | Lione | 239—227 |
| 2,991,203 | 7/1961 | Veld et al | 239—227 |
| 3,001,534 | 9/1961 | Grant | 239—227 |
| 3,379,379 | 4/1968 | Orem | 239—227 |

EVERET W. KIRBY, Primary Examiner

U.S. Cl. X.R.

134—112, 167